(12) United States Patent
Mehan

(10) Patent No.: US 9,244,237 B2
(45) Date of Patent: Jan. 26, 2016

(54) OPTICAL FIBER WITH RESILIENT JACKET

(71) Applicant: TYCO ELECTRONICS CORPORATION, Berwyn, PA (US)

(72) Inventor: Ashok K. Mehan, Union City, CA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 48 days.

(21) Appl. No.: 13/749,906

(22) Filed: Jan. 25, 2013

(65) Prior Publication Data

US 2013/0202258 A1  Aug. 8, 2013

Related U.S. Application Data

(60) Provisional application No. 61/595,223, filed on Feb. 6, 2012.

(51) Int. Cl.
*G02B 6/44* (2006.01)

(52) U.S. Cl.
CPC ............ *G02B 6/4401* (2013.01); *G02B 6/4402* (2013.01); *G02B 6/4486* (2013.01); *G02B 6/443* (2013.01)

(58) Field of Classification Search
CPC ........... G02B 6/44; G02B 6/00; G02B 6/4401
USPC ........................................................ 385/100
See application file for complete search history.

(56) References Cited

U.S. PATENT DOCUMENTS

| | | | | |
|---|---|---|---|---|
| 4,000,936 A | * | 1/1977 | Gloge | 385/102 |
| 5,047,627 A | * | 9/1991 | Yim et al. | 250/227.23 |
| 5,062,685 A | * | 11/1991 | Cain et al. | 385/114 |
| 5,093,888 A | * | 3/1992 | Takezawa et al. | 385/141 |
| 5,111,526 A | * | 5/1992 | Yamamoto et al. | 385/145 |
| 5,333,229 A | * | 7/1994 | Sayegh | 385/102 |
| 5,675,686 A | * | 10/1997 | Rosenmayer et al. | 385/114 |
| 6,068,796 A | * | 5/2000 | Graham et al. | 264/1.28 |
| 6,164,817 A | * | 12/2000 | Trainer | 374/19 |
| 6,282,349 B1 | * | 8/2001 | Griffin | 385/81 |
| 6,463,199 B1 | * | 10/2002 | Quinn et al. | 385/109 |
| 6,707,973 B2 | * | 3/2004 | Witt et al. | 385/109 |
| 7,162,130 B2 | * | 1/2007 | Castellani et al. | 385/128 |
| 7,203,405 B1 | * | 4/2007 | Storaasli | 385/113 |
| 7,274,844 B2 | * | 9/2007 | Walt et al. | 385/38 |
| 7,471,360 B2 | * | 12/2008 | Murakami et al. | 349/117 |
| 8,265,438 B2 | * | 9/2012 | Knoch et al. | 385/111 |
| 8,637,766 B2 | * | 1/2014 | Takayasu | 136/263 |
| 2001/0000930 A1 | * | 5/2001 | Kim | 264/1.24 |
| 2002/0033132 A1 | * | 3/2002 | Kim | 118/407 |

(Continued)

FOREIGN PATENT DOCUMENTS

DE    38 21 123 A1    12/1989
WO    2009154990 A2    12/2009

OTHER PUBLICATIONS

International Search Report, International Application No. PCT/US/2013/024587, International Filing Date, Apr. 2, 2013.

*Primary Examiner* — Kaveh Kianni

(57) ABSTRACT

An optical fiber with a resilient jacket is disclosed. The optical fiber includes a cushion layer overlying the optical fiber in which the cushion layer is formed from a plurality of cushion members. The cushion members can be tubes that are hollow or that are partially or completely filled with a soft thermoplastic material. A polymeric sleeve overlies the cushion layer.

12 Claims, 1 Drawing Sheet

(56) References Cited

U.S. PATENT DOCUMENTS

| | | | |
|---|---|---|---|
| 2003/0099446 A1* | 5/2003 | Witt et al. | 385/109 |
| 2005/0250156 A1* | 11/2005 | Shebuski et al. | 435/7.1 |
| 2006/0257095 A1* | 11/2006 | Walt et al. | 385/147 |
| 2007/0044991 A1* | 3/2007 | Varkey | 174/102 R |
| 2007/0046870 A1* | 3/2007 | Murakami et al. | 349/117 |
| 2008/0247720 A1* | 10/2008 | Cody et al. | 385/114 |
| 2010/0067856 A1* | 3/2010 | Knoch et al. | 385/111 |
| 2011/0284072 A1* | 11/2011 | Takayasu | 136/256 |
| 2012/0230686 A1* | 9/2012 | Tang et al. | 398/43 |
| 2012/0243876 A1* | 9/2012 | Tang | 398/135 |
| 2014/0163664 A1* | 6/2014 | Goldsmith | 623/1.11 |

\* cited by examiner

OPTICAL FIBER WITH RESILIENT JACKET

FIELD

This application is directed to optical fibers and more particularly to rugged optical fibers having a resilient jacket.

BACKGROUND

The carrying capacity and communication rate of optical fibers significantly exceeds that provided by conventional copper wire. As such, optical fibers are being used in increasingly diverse settings where features such as high information capacity, noise immunity and other advantages may be exploited, from telecommunications to aerospace to consumer electronics and beyond.

Despite their advantages, optical fibers are generally more fragile than conventional copper wire. This may be the case regardless whether the optical fibers are glass or plastic. In either case, a mechanical shock has the potential to cause an instantaneous disruption in the flow of light. More problematic can be situations in which the mechanical shock results in a break of a glass fiber and/or a plastic deformation of a plastic fiber. This can cause a permanent change in the shape of the fiber and thereby introduce noise, slow the transfer of information, or otherwise cause the fiber to perform below expected performance levels.

Optical fibers typically include insulating wraps/braids and/or a jacket that provides some protection against handling and other wear, but which may not provide a satisfactory level of impact protection. Thicker and multilayer fibrous polymeric or ceramic braids in combinations with wraps and polymeric jackets tend to make the fiber assembly bulky and heavy, rendering it unattractive for airframe applications where size and weight are often important. Metallic protective layers are also too heavy for most airborne applications. These and other drawbacks are found in current optical fibers.

SUMMARY

What is needed is an optical fiber having a jacket that offers more rugged protection than what is currently available, which can provide increased impact protection and more reliable performance.

According to an exemplary embodiment of the invention, a jacketed optical fiber is disclosed. The jacketed optical fiber comprises an optical fiber; a cushion layer overlying the optical fiber, the cushion layer comprising a plurality of cushion members; and a polymeric sleeve overlying the cushion layer. In some embodiments, the cushion members are hollow, while in others the cushion members are at least partially filled with a soft thermoplastic material. In certain embodiments, an adhesive layer comprising an adhesive or mastic material is provided intermediate the cushion layer and the polymeric sleeve.

An advantage of exemplary embodiments of the invention is that the jacket includes a cushion layer that provides increased impact resistance. This may result in better performance, including decreasing the likelihood that a mechanical shock suffered by the fiber will result in deformation that could cause a loss in optical power.

Other features and advantages of the present invention will be apparent from the following more detailed description of exemplary embodiments, taken in conjunction with the accompanying drawings which illustrate, by way of example, the principles of the invention.

BRIEF DESCRIPTION OF THE DRAWINGS

Where like parts appear in more than one drawing, it has been attempted to use like reference numerals for clarity.

DETAILED DESCRIPTION OF EXEMPLARY EMBODIMENTS

Exemplary embodiments are directed to jacketed optical fibers that employ a cushion layer, including hollow tubing in some embodiments, for mitigating damage from the impact of mechanical loads and which can provide very good overall mechanical protection.

Figure 1:
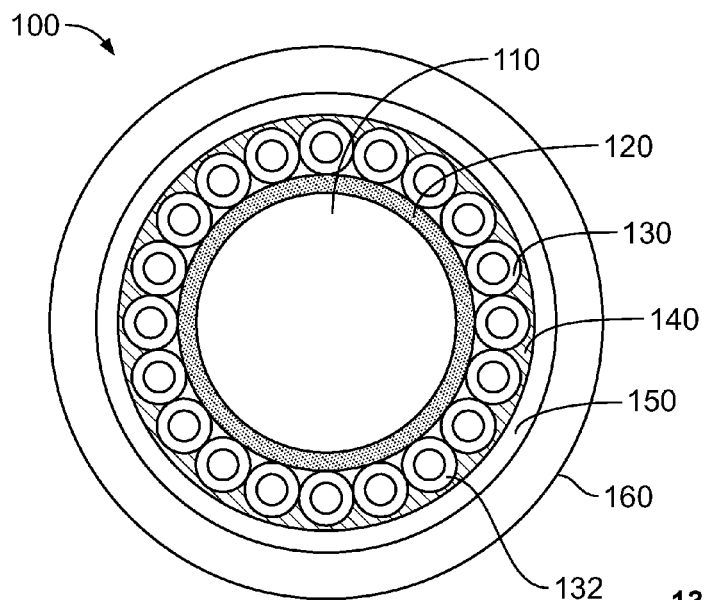
FIG. 1 illustrates a cross-sectional view of a jacketed optical fiber in accordance with an exemplary embodiment of the invention.

Turning to FIG. 1, exemplary embodiments of the invention are directed to a jacketed optical fiber 100 and fiber optic cables in which a plurality of such fibers 100 are bundled. It will be appreciated that the general principles associated with bundling individual optical fibers to form a fiber optic cable are known in the art and as a result, are not discussed in further detail herein.

The jacketed optical fiber 100 includes an optical fiber 110 as its core. The optical fiber 110 may be glass, plastic or any other material used to form an optical fiber, but is preferably a plastic optical fiber, sometimes referred to in the art as a POF. Any POF fiber may be used, but is typically constructed of poly(methyl)methacrylate (PMMA). Standard PMMA optical fibers have a diameter of about 980 microns, with a thin coating (typically about 20 microns) of a fluoropolymer cladding. Although these and other dimensions used herein are exemplary, it will be appreciated that the principles of the invention are not so limited and can be readily applied in conjunction with optical fibers 110 having a dimension other than 980 microns.

A buffer layer 120 is optionally, but preferably, provided over the optical fiber 110, generally by extruding. The buffer layer 120 is typically a polyolefin and has a thickness in the range of about 0.002 inches to about 0.01 inches, generally about 0.006 inches (about 0.15 mm). The polyolefin can be any suitable material and may be elastomeric and/or a fluoropolymer and is preferably not cross-linked; the buffer layer 120 aids in stripping the polymeric layers of the jacketed fiber 100 from the optical fiber 110 for termination. Exemplary materials for use as the buffer layer include chlorinated polyethylene (PE), silicone, fluoropolymer, epoxy or a polymeric resinous layer.

Figure 3A:
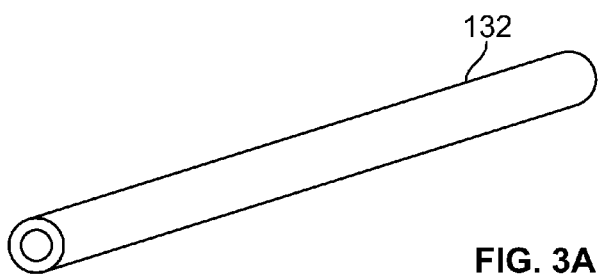
FIGS. 3a and 3b illustrate exemplary cushion members for use in creating the cushion layer.

A cushion layer 130 is applied overlying the optical fiber 110, typically in contact with the buffer layer 120. The cushion layer 130 comprises one or more cushion members that at least partially encase the optical fiber 110 along its length and that serve to provide enhanced impact protection. The cushion members are preferably formed of a high strength material. In some embodiments, the cushion members are hollow. It will be appreciated, however, that the cushion members need not be hollow and in some embodiments one or more cushion members are partially or entirely filled with a soft thermoplastic material. As illustrated in FIG. 1, the cushion members are preferably fibers formed as tube cushion members 132 (see FIG. 3a).

In addition to impact protection, the use of hollow cushion members may allow weight savings compared to cables employing higher specific materials like glass fibers or even solid monofilaments or solid multi-filament strength tows. For example, embodiments disclosed herein using hollow cushion members have a cushion layer 130 that is about 25% by volume air that aids to impart improved crush and impact performance in the construction.

The tube cushion members 132 or other type of cushion members may be constructed of any suitable polymeric material with a high modulus of elasticity, although as already noted, strong materials such as polyarylene ethers, and particularly polyaryletherketones like polyetheretherketone (PEEK), are preferred and which may be annealed or unannealed. Other suitable materials include polyethersulfone (PES), ultra high molecular weight polyethylene (UHM-WPE), polysulfone (PS), polyethyleneimide (PEI), and copolymers thereof, by way of example only.

The wall thickness of the cushion layer 130 may be determined by the outer diameter of the cushion members. The tubes 132 generally have an outer diameter in the range of about 0.006 inches to about 0.010 inches, typically about 0.008 inches. The wall thickness of the tubes 132 is generally in the range of about 0.001 inches to about 0.003 inches, typically about 0.002 inches. As already noted, it will be appreciated that the ranges associated with these and other dimensions herein are not intended to be limiting. While these dimensions are useful for constructing a jacketed optical fiber 100 in conjunction with a standard POF having a diameter of about 980 microns as the core, the various layer thicknesses, as well as the wall size of the cushion members, can all be adjusted accordingly if other size optical fibers are employed.

The tube cushion members 132 may be hollow, containing air, or may be partially or entirely filled with a soft thermoplastic material such that the tube still exhibits a suitable level of elasticity to serve as a cushion member. Exemplary fill materials include fluorinated ethylene propylene (FEP), tetrafluoroethylene, hexafluoropropylene and vinylidene fluoride copolymer (THV), polyvinylidene fluoride (PVdF), or a fluoroelastomer (such as those commercially available as Aflas or Viton), all of which can provide a cushion effect. In filled tube cushion members 132, the use of a fluorinated polymer has the additional advantage of providing a filling material improved flammability and smoke resistance.

Figure 2:
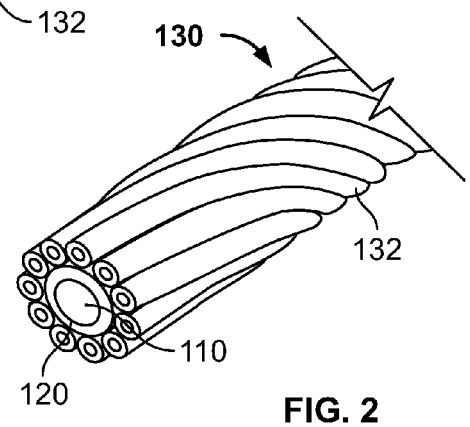
FIG. 2 illustrates a perspective view of the optical fiber of FIG. 1 after the cushion layer has been applied, but before other overlying layers are applied.

As shown in FIG. 2, the cushion layer 130 may be formed by wrapping the tube cushion members 132 around the optical fiber 110 in a helical manner. The angle at which the cushion members helically wrap about the optical fiber 110 (i.e., the "helix angle") may vary in different embodiments and may depend, at least in part, on the number and size of the cushion members employed. The helix angle may range from about 5 degrees to about 80 degrees. At lower helix angles, the tube cushion members 132 may tend to take on an elliptical cross-section, while the tube cushion members 132 retain their circular cross-section at higher helix angles.

Figure 3B:
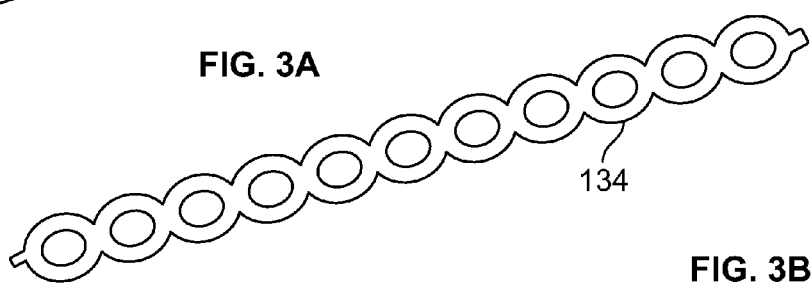

Although the cushion members that form the cushion layer 130 have been primarily illustrated and discussed in terms of filled or hollow tube cushion members 132, it will be appreciated that embodiments are not so limited. For example, FIG. 3b shows an alternative embodiment in which the cushion member is a continuous string of closely packed beads in which discrete beads of air are formed along the length of a fiber. The hollow bead fiber cushion member 134 can be made, for example, by extruding using suitably profiled chilled rollers in a similar manner as that used to produce continuous convoluted tubing.

An adhesive layer 140 is optionally, but preferably applied over the cushion layer 130. The adhesive layer 140 is useful for maintaining the separate cushion members of the cushion layer 130 in place with respect to one another during the application of subsequent layers, as well as for maintaining the cushion members in place while absorbing an impacting load. The adhesive layer 140 may be any suitable adhesive or mastic material including acrylate, polyamide, or polyurethane based adhesives that preferably bond well to the cushion layer 130 as well as to the polymeric sleeve 150 to achieve an intimate contact between these two layers.

While the adhesive layer 140 may employ any adhesive for purposes of binding the cushion members, it will be appreciated that in certain embodiments in which the jacketed optical fiber 100 is to be used in aerospace or other specialty applications, other factors may come into play. For example, the adhesive's flammability, smoke level, release of toxic gasses when burnt, or other physical properties beyond its adhesion may be taken into consideration when selecting what adhesive to use for the adhesive layer 140. The adhesive layer 140 is preferably a halogen rich formulation when low smoke, low toxicity and low flammability are desired. Terpolymers of tetrafluoroethylene, hexafluoropropylene and vinyledenedifluoride with blends of EVA/EMA/EMA-AA, EAA, EMA-GMA are especially suitable. One suitable adhesive formulation is described in U.S. Publication No. 2009/0114343, which is incorporated by reference herein.

The adhesive of the adhesive layer 140 will have a tendency to fill the space around the tube cushion members 132 or other type of cushion member. The adhesive layer 140 will typically be less uniform than other layers as a result of the topography resulting from the tube cushion members 132 used in the cushion layer 130 and the thickness of the adhesive layer may usefully be measured and selected with respect to the outer diameter of the cushion layer 130 (i.e. the outer diameter of the cushion members) so as to minimize diameter build up of the fiber 100. In some embodiments, the adhesive layer 140 may be applied to a thickness of about 0.001 inches beyond the outer diameter of the tube cushion members 132, and in one embodiment is applied such that the jacketed optical fiber 100 has an outer diameter of about 1.8 mm after application of the adhesive layer 140. It is further preferable in some embodiments to select a material for the adhesive layer 140 that can be applied in thin layers in a pressure extrusion set up, commonly employed in wire and cable manufacturing processes, such as described in U.S. Publication No. 2010/0219555 which is hereby incorporated by reference.

Alternatively, the adhesive layer 140 may be applied in the form of a tape, typically wrapped about the fiber 100 in a direction opposite that of the tube cushion members 132. One suitable tape is a polyimide tape (e.g. Kapton tape). If a tape is employed, the thickness of the tape may be about 0.001 inches, although any suitable thickness may also be employed.

In some embodiments, multiple cushion layers 130 may be employed. In such cases, the cushion layers 130 may be applied directly over top of one another followed by a single adhesive layer 140. Alternatively, a separate adhesive layer 140 could be applied over each separate cushion layer 130.

A polymeric sleeve 150 is applied over the cushion layer 130, typically overlying and in contact with the adhesive layer 140. The polymeric sleeve 150 is generally formed by extrusion and may be constructed of any suitable polymeric material that bonds well to the adhesive layer 140. The polymeric sleeve 150 provides strength to the jacketed optical fiber 100 and is typically constructed from a material having a tensile strength greater than about 4000 psi and preferably having a tensile strength greater than about 5000 psi. Particularly suitable materials for use in the polymeric sleeve 150 include polyaryletherketones, such as polyetheretherketone (PEEK), although nylon, polyesters, and silicone elastomers, for example, may also be employed. Generally, any materials suitable for forming the cushion members of the cushion layer 130 may also be used in forming the polymeric sleeve 150 and vice versa. In some embodiments, the polymeric sleeve 150 may be a miscible blend of one or more different types of polymers.

The polymeric sleeve 150 generally has a thickness in the range of about 0.0005 inches to about 0.010 inches, but it will again be appreciated that these and other thicknesses discussed herein are exemplary and may vary depending on the relative thickness of the other layers of the jacketed optical fiber 100 and particularly the diameter of the optical fiber 110 that serves as the core. The termination of the jacketed optical fiber 100 may also be considered in selecting a particular thickness for the polymeric sleeve 150.

The polymeric sleeve 150 may be the outer layer for the jacketed optical fiber 100, such that this layer is exposed to the environment. In some embodiments, an optional outer jacket 160 is applied over the polymer sleeve 150. Although optional, the final outer jacket 160 may be particularly desirable in aerospace applications, in which a melt-extrudable polytetrafluoroethylene (PTFE), other fluoropolymer, PEI, or other material is applied because of its chemically inert nature, low smoke and flammability characteristics and other properties known to be useful for aerospace. If applied, an outer jacket 160 may be applied to a wall thickness in the range of about 0.004 inches to about 0.016 inches, typically about 0.006 to about 0.010 inches.

EXAMPLES

The invention is further described by way of the following examples, which are presented by way of illustration and not of limitation.

Example 1

PMMA optical fibers having a diameter of 980 microns (±60 microns) with a 20 micron fluoropolymer cladding and about 0.006 inches of a protective fluoropolymer buffer layer were provided. A cushion layer was formed using hollow tubing as cushion members. The hollow tubing was formed from PEEK and was extruded to a nominal outer diameter of approximately 0.009 inches and a wall thickness of approximately 0.002 inches. Eight hollow PEEK tubes were used to form the cushion layer by wrapping around the fiber's core using a helix angle of 34.6 degrees. Wrapping was carried out using a sixteen carrier Wardwell Braider; only the upper eight carriers—all turning clockwise—were employed. Each carrier had a bobbin with two ends of the hollow tubing, so that 16 sleeves were wrapped in one revolution of the carriages. The thickness of the cushion layer after wrapping was about 0.095 inches.

A fluoropolymer (THV)-base hot melt adhesive with the composition given in Table 1 was applied over the cushion layer to a thickness of about 0.001 inches. The adhesive also contained small amounts of a primary antioxidant (Irganox 1010), secondary stabilizer (Arenox 1212) and a color concentrate. This was followed by applying a 0.004 inch polymeric sleeve of PEEK. Finally, an outer jacket of a fluoropolymer (melt extrudable PTFE, Moldflon Grade MF 10010) was extruded having a thickness of 0.007 inches.

TABLE 1

| DESCRIPTION | % W/W |
|---|---|
| THV 221 | 35.50% |
| Dai-El G101 | 14.50% |
| Lotader AX 8900 | 15.00% |
| Lotryl 320 | 13.00% |
| Saytex 8010 | 8.00% |
| Bright Sun HB 500 | 4.50% |

Example 2

In a second example, jacketed optical fibers were produced in the same manner as described in Example 1, except that the buffer layer was a non-flame retarded polyolefin elastomer instead of the flame retarded buffer used in that example.

Example 3

In a third example, PMMA optical fibers having a diameter of 980 microns (±60 microns) with a 20 micron fluoropolymer cladding coated with a non flame-retarded polyolefin elastomer buffer were again provided. The cushion layer was formed in the same manner as Examples 1 and 2.

The same hot melt adhesive was pressure extruded over the core. In this example, a 0.006 inch polymeric sleeve of PEEK was applied by extrusion, followed by an outer jacket of a fluoropolymer (Moldflon Grade 10010) having a thickness of 0.005 inches.

The fibers made according to each of Examples 1, 2 and 3 were subjected to impact testing along with a control fiber that did not contain a cushion layer. In the test, the fibers were all used to connect an oscilloscope to an optical source. The experimental fibers were then subjected to an impact (by dropping a weight of about 1.4 kg at a height of about 5 cm) at various points along the fiber length. The oscilloscope measured any change in optical power both instantaneously upon impact and shortly thereafter. Instantaneous power loss on impact was about 0.5 dB or less for the experimental samples, with a post-impact loss of about 0.15 dB or less, while the comparative sample demonstrated losses of nearly two orders of magnitude higher, in the range of about 10 dB.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A jacketed optical fiber comprising:
an optical fiber;
a cushion layer overlying the optical fiber, the cushion layer comprising a plurality of elongate tube cushion members; and
a polymeric sleeve overlying the cushion layer;
wherein each of the elongate tube cushion members includes a separate wall portion defining an inner diameter and an outer diameter, the outer diameter of each of the elongate tube cushion members being smaller than a diameter of the optical fiber; wherein the polymeric sleeve comprises a polymeric material having a tensile strength greater than 4000 psi.

2. The jacketed optical fiber of claim 1, wherein the tube cushion members are helically wrapped about the optical fiber.

3. The jacketed optical fiber of claim 1, wherein at least one of the cushion members is hollow.

4. The jacketed optical fiber of claim 1, wherein at least one of the cushion members is at least partially filled with a fluorinated polymer.

5. The jacketed optical fiber of claim 1 further comprising a buffer layer intermediate the optical fiber and the cushion layer.

6. The jacketed optical fiber of claim 1 further comprising an adhesive layer intermediate the cushion layer and the polymeric sleeve.

7. The jacketed optical fiber of claim 1 further comprising a fluoropolymer layer overlying the polymeric sleeve.

8. The jacketed optical fiber of claim 1, wherein the optical fiber is a plastic optical fiber.

9. The jacketed optical fiber of claim 8, wherein the plastic optical fiber comprises poly(methyl) methacrylate.

10. The jacketed optical fiber of claim 1, wherein the cushion layer comprises a polyaryl ether.

11. The jacketed optical fiber of claim 10, wherein the polyaryl ether comprises polyetheretherketone.

12. The jacketed optical fiber of claim 1, wherein the cushion layer comprises a material selected from the group consisting of polyethersulfone, ultra high molecular weight polyethylene, polysulfone, polyethyleneimide, and copolymers thereof.

* * * * *